United States Patent
Tuzel et al.

(10) Patent No.: US 9,262,810 B1
(45) Date of Patent: Feb. 16, 2016

(54) IMAGE DENOISING USING A LIBRARY OF FUNCTIONS

(71) Applicant: Mitsubishi Electric Research Laboratories, Inc., Cambridge, MA (US)

(72) Inventors: Oncel Tuzel, Winchester, MA (US); Jay Thornton, Watertown, MA (US); Jeroen van Baar, Arlington, MA (US)

(73) Assignee: Mitsubishi Electric Research Laboratories, inc., Cambridge, MA (US)

( * ) Notice: Subject to any disclaimer, the term of this patent is extended or adjusted under 35 U.S.C. 154(b) by 0 days.

(21) Appl. No.: 14/475,806

(22) Filed: Sep. 3, 2014

(51) Int. Cl.
*G06T 5/00* (2006.01)
*G06T 5/20* (2006.01)
*G06K 9/46* (2006.01)

(52) U.S. Cl.
CPC .............. *G06T 5/002* (2013.01); *G06K 9/4642* (2013.01); *G06T 5/20* (2013.01); *G06T 2207/10004* (2013.01); *G06T 2207/20021* (2013.01); *G06T 2207/20182* (2013.01)

(58) Field of Classification Search
CPC . G06T 5/002; G06T 5/20; G06T 2207/20021; G06T 2207/20182; G06T 2207/10004; G06K 9/4642; G06K 9/6256; G06K 9/66; G06K 9/6217; G06K 9/6282; G06F 17/30256
USPC ......... 382/159, 254, 275, 260, 264, 162, 274, 382/167, 100, 128, 131, 263, 265, 276, 293, 382/294, 261, 262, 154, 132, 266, 155, 181, 382/190, 195, 232, 240
See application file for complete search history.

(56) References Cited

U.S. PATENT DOCUMENTS

| 6,718,068 | B1 | 4/2004 | Gindele et al. |
| 7,937,588 | B2* | 5/2011 | Picard .................. G06T 1/0042 713/176 |
| 7,958,096 | B2* | 6/2011 | Perrizo .................. G06N 7/06 707/693 |
| 8,320,698 | B2 | 11/2012 | Baqai |
| 8,478,062 | B2* | 7/2013 | Kumar .................. G06T 5/002 382/254 |
| 2014/0153819 | A1* | 6/2014 | Lin .................. G06T 5/002 382/159 |

OTHER PUBLICATIONS

Michael Elad et al., "Image denoising via sparse and redundant representations over learned dictionaries," IEEE Trans. Image Process., vol.15, No. 12, pp. 3376-3745, Dec. 2006.*
Pietro Perona and Jitendra Malik (Jul. 1990). "Scale-space and edge detection using anisotropic diffusion". IEEE Transactions on Pattern Analysis and Machine Intelligence, 12 (7): 629-639.
C. Tomasi and R. Manduchi, "Bilateral filtering for gray and color images," in Proc. 6th Int. Conf. Computer Vision, Washington, DC, Jan. 1998, pp. 839-846.
A. Buades, B. Coll, and J-M. Morel, "A non-local algorithm for image denoising," in proc. IEEE Conf. Computer vision and Pattern Recognition, Oct. 2005, vol. 2, pp. 60-65.

(Continued)

*Primary Examiner* — Sheela C Chawan
(74) *Attorney, Agent, or Firm* — Dirk Brinkman; Gene Vinokur

(57) ABSTRACT

A method denoises a noisy image by, for each pixel in the noisy image, first constructing a key from a patch, wherein the patch includes locally neighboring pixels around the pixel. A function is selected from a function library using the key. Then, the function is applied to the patch to generate a corresponding noise free pixel for the pixel.

11 Claims, 7 Drawing Sheets

(56) References Cited

OTHER PUBLICATIONS

M. Elad and M. Aharon, "Image denoising via sparse and redundant representations over learned dictionaries," IEEE Trans. Image Process., vol. 15, No. 12, pp. 3376-3745, Dec. 2006.

K. Dabov, A. Foi, V. Katkovnik, and K. Egiazarian, "Image denoising with block-matching and 3D filtering," Proc. SPIE Electronic Imaging '06, No. 6064A-30, San Jose, California, USA, Jan. 2006.

A. Barbu, "Learning Real-Time MRF Inference for Image Denoising", CVPR 2009.

* cited by examiner

IMAGE DENOISING USING A LIBRARY OF FUNCTIONS

FIELD OF THE INVENTION

The invention relates generally to image processing, and more particularly to processing images to reduce noise and enhance image content.

BACKGROUND OF THE INVENTION

The goal of image denoising is to reconstruct a "noise free" enhanced image from an image corrupted with noise. Many image processing methods exist for image denoising.

The first group of methods uses local methods where a noise free estimate of a target pixel is reconstructed as a weighted average of pixel values within a small spatial neighborhood of the target pixel. One such method convolves the noisy image with a smoothing filter such as a Gaussian kernel function where weights decrease with distance from the target pixel according to the function. Due to the linear filtering operation, which is insensitive to the local image structure (pixel values) within the neighborhood, the resulting image usually has blurry artifacts.

To overcome the blurring artifact, other local methods attempt to make the filters "edge-aware" by using non-linear filters. A median filter reconstructs a pixel value as a median value of the pixel values within the neighborhood.

Another method uses anisotropic diffusion, where a shape of the filter can be adapted to local image structure as a result of a diffusion process, which is sensitive to image discontinuities.

A sigma filter identifies pixels that are similar to the target pixel within its neighborhood by thresholding the absolute pixel value difference between the target pixel and other pixels within the neighborhood. The target pixel is then reconstructed by an average of only the similar pixel values (pixels with difference within the similarity threshold) within the neighborhood. The weights in that model can be considered as being 0 or 1 according to similarity criteria.

Several extensions to sigma filter are known. For example, one can use a bilateral filter where, instead of a hard thresholding operator (0 or 1 weights), the weights are continuously varied according to a multiplication of two kernel functions, one in spatial domain, and one in range (pixel value) domain.

Another method examines different local image areas around the pixel of interest, and determines a noise free estimate for each local area. The estimate for the pixel of interest is then determined as some weighted average of the local area estimates.

Another method determines a noise variance for each pixel value, which is stored in a lookup table. A similarity threshold and weights are then adjusted based on this noise model.

Local denoising methods benefit from spatial locality, which allows fast computation. However, those methods fail to use global statistics of an image, such as repeating patterns, which is an important cue for image denoising.

The second group of methods uses non-local denoising methods. The non-local method retrieves image patches similar to the target image patch by searching all patches within the image. Then, the target patch is replaced by a weighted average of the similar patches.

Alternative non-local methods include sparse reconstruction of image patches using a learned dictionary from the same image, and transform domain non-local filtering. The non-local search step of those methods makes them difficult to use in systems with computational and memory constraints.

Alternatively, non-local denoising can be achieved by performing inference on a Markov random field (MRF) using graph cuts or belief propagation. To achieve fast performance, the number of iterations is small, leaving considerable noise in the result.

SUMMARY OF THE INVENTION

The embodiments of the invention provide a method for denoising a noisy image to generate a noise free enhanced image. The method uses a library of local denoising functions. For each pixel of the image, a key is constructed using a local neighborhood (patch) around the pixel. The key maps each pixel to a denoising function in the function library. The noise free reconstruction of the pixel is determined by applying the selected function to the patch of pixels.

The library of denoising functions can be learned, for example, using training images in an offline process. The learning process minimizes a reconstruction error. The method combines non-linear mapping through the keys with the functions. The functions are optimized for various patch configurations to provide better reconstruction than existing hand tuned local denoising methods, while still allowing fast processing.

DETAILED DESCRIPTION OF THE PREFERRED EMBODIMENTS

Figure 1:
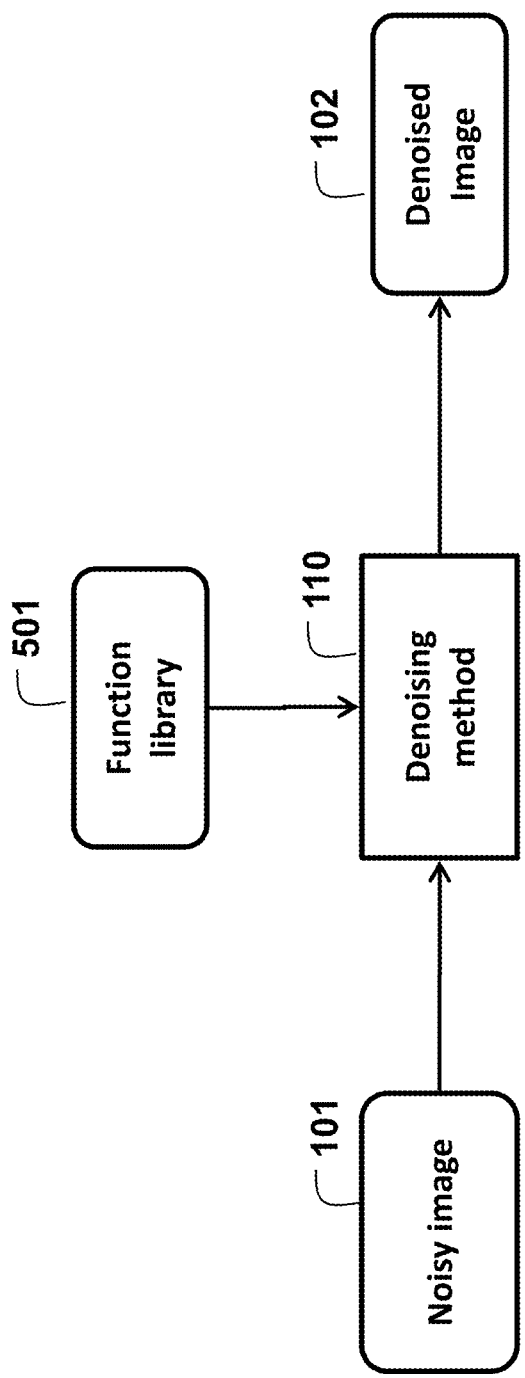
FIG. 1 is a flow diagram of a denoising method according to embodiments of the invention.

FIG. 1 is a flow diagram of a method for denoising 110 a noisy image 101 using a library 501 of local denoising functions to produce a denoised image 102 according to embodiments of the invention. The method can be performed in a processor connected to memory and input/output interfaces by buses as known in the art.

Figure 2:
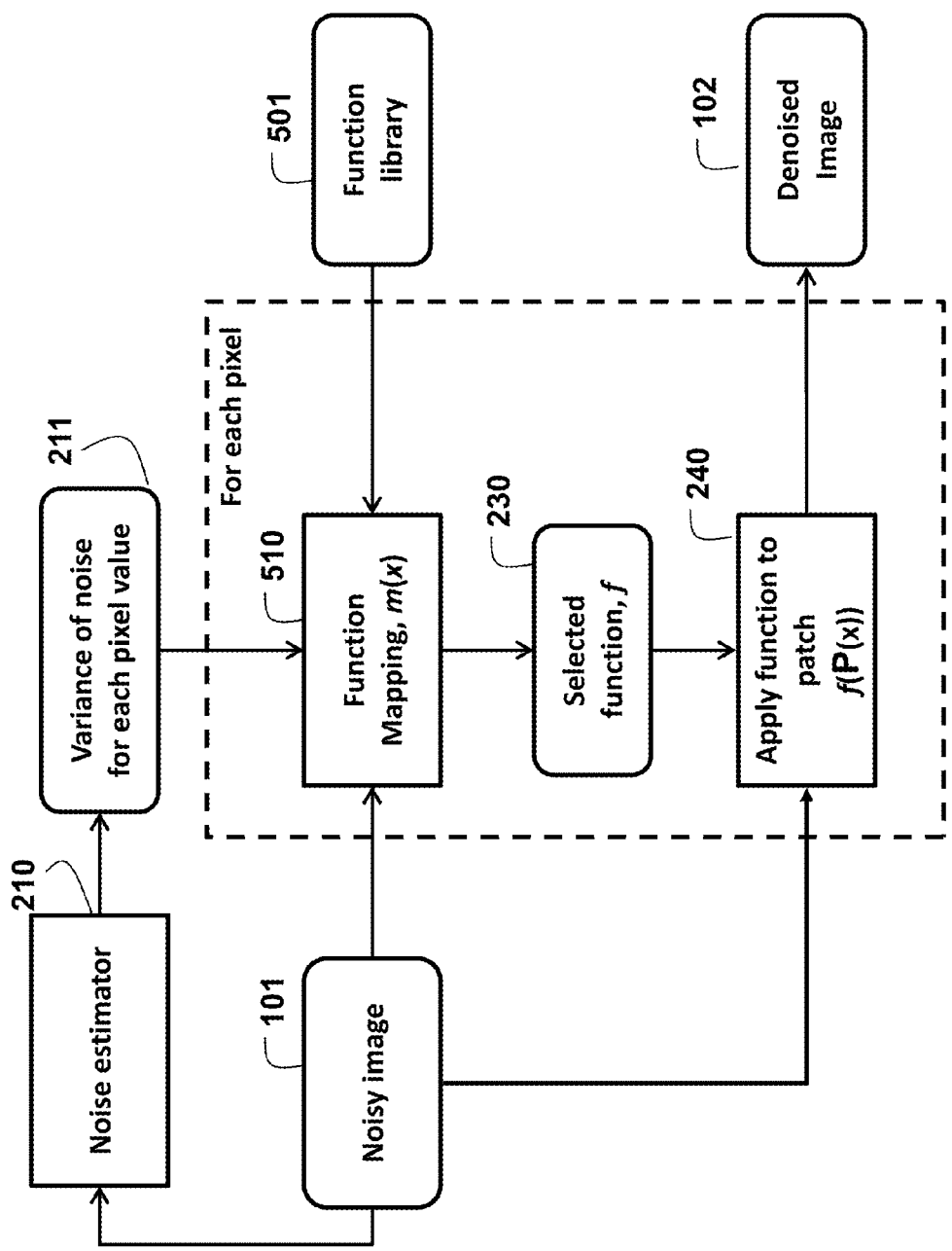
FIG. 2 is a detailed flow diagram of the denoising method to embodiments of the invention.

FIG. 2 is a detailed flow diagram of the denoising method. A pixel x in the noisy image has a value I(x). A local neighborhood or "patch" around the pixel is P(x). The patch can have arbitrary shapes such as a rectangle, ellipse, or an irregular arrangement of pixels adapted to the image content.

Noise estimator 210 determines a noise variance σ 211 for each pixel using the local neighborhood or patch of pixels P(x) in the noisy image 101. The function mapping m(x) 510 maps each pixel to a function 230 using the noise variance estimation and a local neighborhood of the pixel, see FIG. 5. The selected function f 230 is applied 240 to the patch P(x) in the noisy image, to generate a corresponding denoised pixel for the denoised image 102.

Noise Estimation

During the noise estimation 210, the method estimates the variance of the noise for each pixel. In one embodiment the variance σ is assumed to be identical for all pixels having the same value v if $I(x)=v$ and $I(y)=v$, then $\sigma(x)=\sigma(y)=\sigma_v$, The variance is estimated using local patches around each pixel. For each patch in the image with mean value v, the variance of the intensity values of the patch is determined, one variance for each patch. If the patch originates from a constant color area, then the variance of this patch is equal to an empirical estimation of the noise.

However, because the patch can also originate from a non-constant color area, the patch variance estimate is approximately the lower bound of the noise variance distribution for pixels with value v. The noise variance of value v is estimated as $k^{th}$ order statistics of a distribution of noise variances for central pixels of the patches with an average value v. In one embodiment, k is selected as, for example, 0.1 of the number of pixels with value v. of a distribution of variance computations of patches central pixel value In general, the variance changes smoothly with changing pixel values. Independent noise estimation for each value results in non-smooth noise profiles. Therefore, the variances are smoothed to produce smooth noise profile.

Function Mapping

For each pixel x of the image, a key is constructed using the patch P(x) around the pixel x and the noise estimate for the pixel value. The key includes a spatial key, and a noise key.

Figure 3:
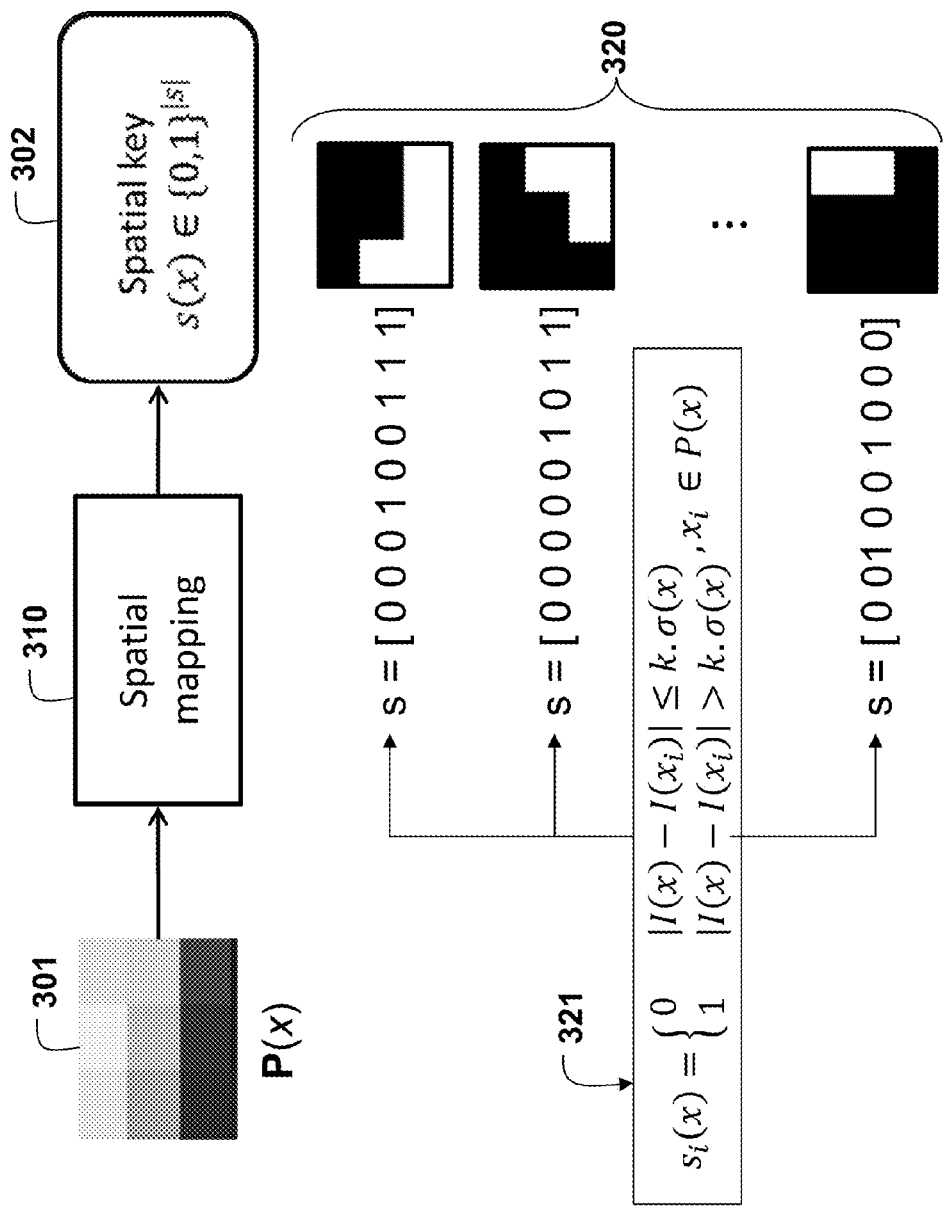
FIG. 3 is a schematic of spatial mapping according to embodiments of the invention.

As shown in FIG. 3 the spatial key 302 is constructed by the spatial mapping function 310 using a patch P(x) 301 of, e.g., 3×3, pixels $I(x_i)$, $x_i \in P(x)$ around the pixel x. The size and the shape of the patch P(x) can be different than the patch that was used to estimate the variance of the noise.

In one embodiment, the spatial key is a local n-ary pattern (LnP), 320 for example a local binary pattern (LbP). For each pixel $x_i$ within the patch one bit of information is acquired. If a difference between the pixel value $I(x_i)$ in the patch and the pixel value I(x) in the noisy image is smaller than the variance for the pixel σ(x), then the bit is set to 0 otherwise the bit is set 321 to 1:

$$s_i(x) = \begin{cases} 0 & |I(x) - I(x_i)| \leq k \cdot \sigma(x) \\ 1 & |I(x) - I(x_i)| > k \cdot \sigma(x) \end{cases}, \quad x_i \in P(x).$$

The spatial key has |s| bits. Examples of determined local binary patterns are shown in FIG. 3 where black pixels (0 bits) correspond to pixels within the patch having similar values to the pixel in the noisy image, i.e., the center pixel in the patch, and white pixels (1 bits) correspond to pixels within the patch having dissimilar values to the pixel in the noisy image.

Figure 4:
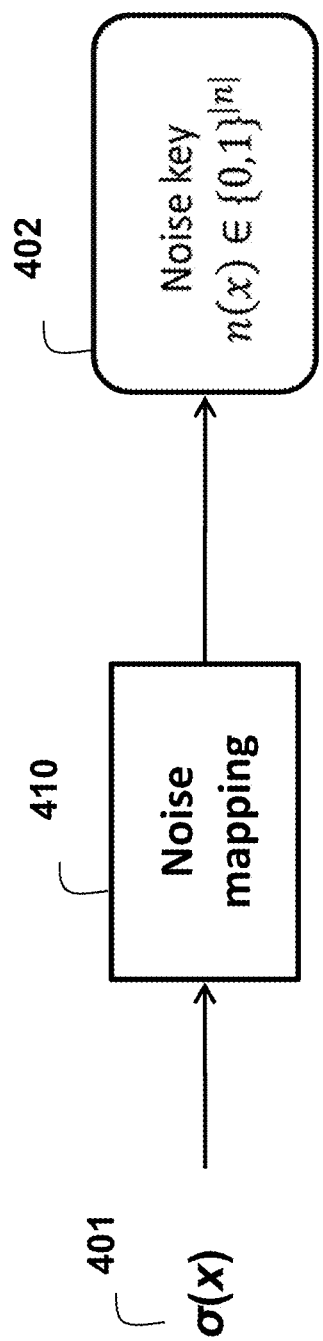
FIG. 4 is a flow diagram of noise mapping according to embodiments of the invention.

FIG. 4 is a flow diagram of the noise mapping. A noise key 402 is constructed by the noise mapping function 410 using the estimation of the variance 401 for the pixel in the noisy image. In one embodiment, the noise key is given by an n bit uniform quantization of variance σ(x):

$n(x)=|n|$ bit quantization of $\sigma(x)$.

The key m for the pixel is a concatenation of the spatial key and the noise key as follows:

$$m(x) = \binom{s(x)}{n(x)},$$

such that the key has |s|+|n| bits.

Figure 5:
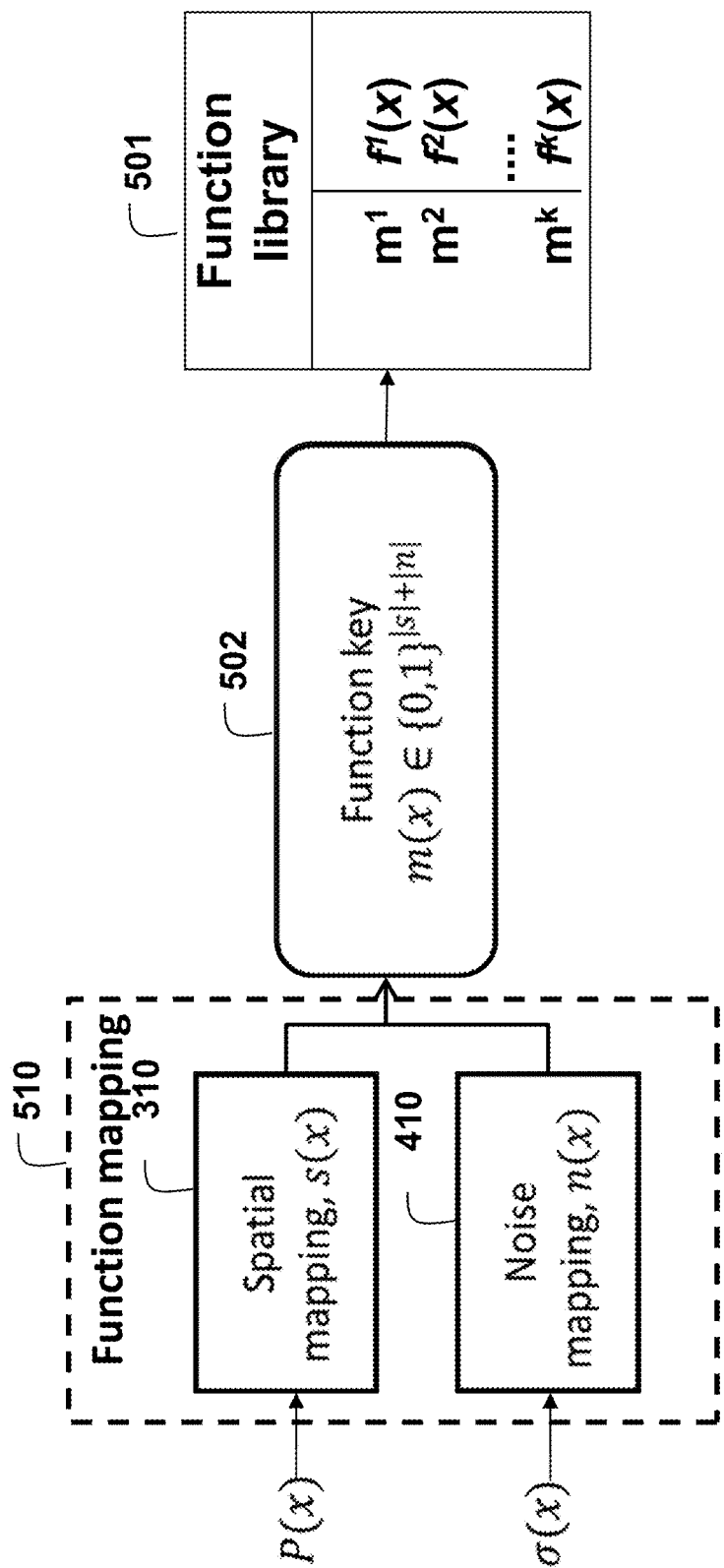
FIG. 5 is a flow diagram of function mapping according to embodiments of the invention.

As shown in FIG. 5, the key m 502 maps 510 a pixel of the image to a denoising function fin the denoising function library 501 that is used to denoise the pixel.

Denoising Using a Library Function

Figure 6:
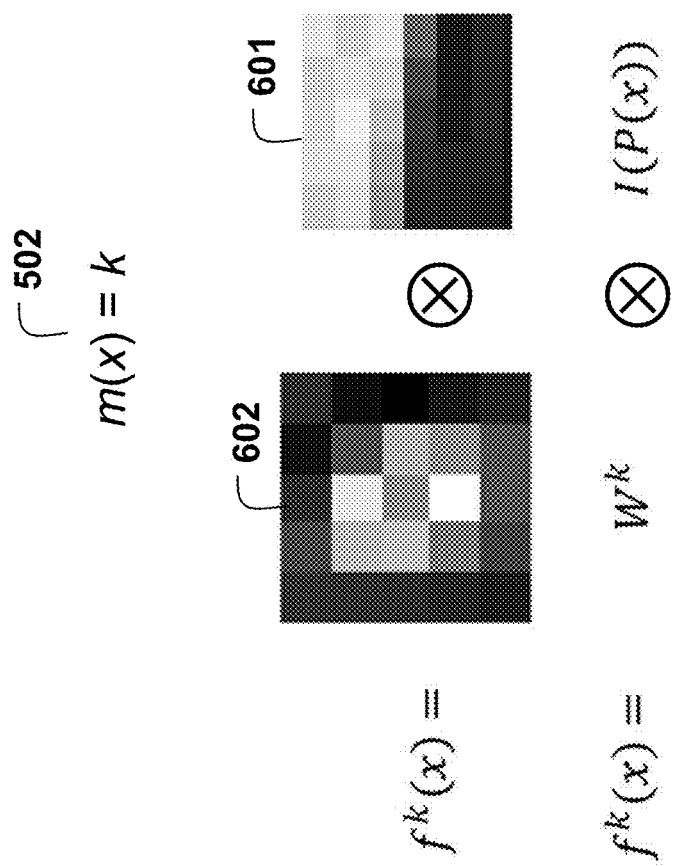
FIG. 6 is a schematic of denoising using a library function according to embodiments of the invention.

As shown in FIG. 6, the key k 502 is determined from noisy image pixel x, and $f^k$ is the corresponding function in the function library. The denoising function uses a patch P(x) 601 around the pixel, i.e., the patch includes locally neighboring pixels around the pixel x. The size and the shape of this patch can be different than the patch that was used to determine the key. In one embodiment the denoising function is a linear function of the pixel intensity in the patch $$f^k(x) = W^k \otimes I(P(x)),$$

where $W^k$ 602 is a weight matrix for the linear function, I(P(x)) is the matrix of pixel intensities for the patch P(x), and ⊗ is an inner product operator between two matrices after vectorization by stacking columns of the matrix into a column vector.

Learning Denoising Function Library

Figure 7:
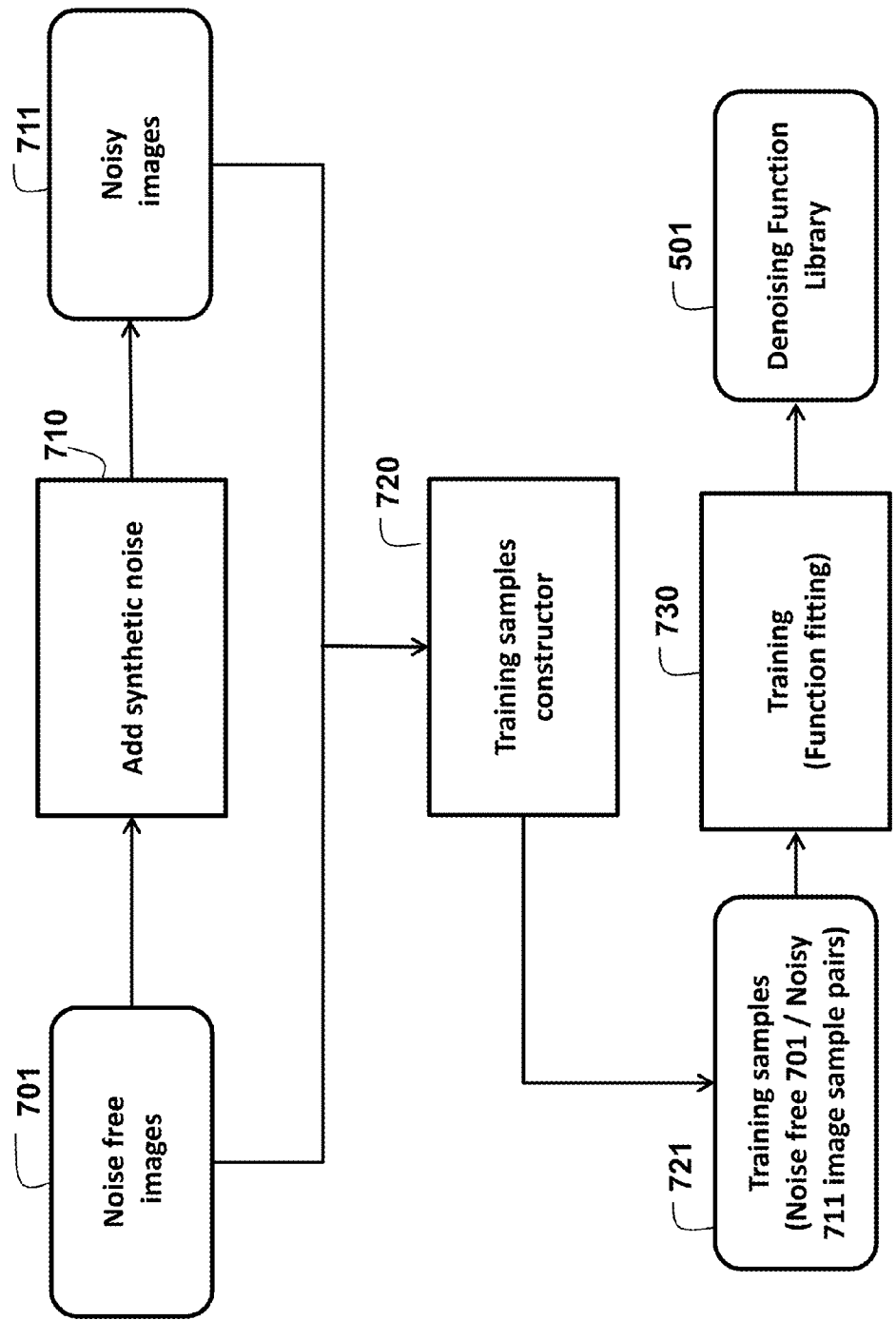
FIG. 7 is a flow diagram of constructing a function library according to embodiments of the invention.

As shown in FIG. 7, the denoising function library 501 is learned using training image samples 721. Training image samples 721 include noise free 701 and corresponding noisy 711 training image sample pairs. The training samples 721 are generated by the training samples constructor 720. In one embodiment, the noisy 711 images are acquired by adding 710 synthetic noise to the noise free 701 images.

The training or function fitting 730 optimizes the functions such that a difference between a reconstruction of the noise free image using the noisy 711 image and the noise free 701 image is minimized:

$$f^k = \underset{f^k}{\operatorname{argmin}} \| F(\tilde{I}) - I \|_2,$$

k=1 . . . 1
where I and $\tilde{I}$ are the noise free and noisy training image sample pairs 721, l is the number of denoising functions in the function library and denoising function F operates per image pixel by first mapping the pixel to the denoising function using the function mapping 510 and then uses the mapped function to denoise the pixel:

$$F(x) = f^{m(x)}(x).$$

In one embodiment, the training is solved by grouping the pixels of the training image pairs according to the keys. Then, each group is optimized separately. When the library functions are linear functions they are learned optimally by solving a linear least squares problem. When they are non-linear functions, they are learned using non-linear optimization techniques such as gradient descent or Newton's method.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for denoising a noisy image, comprising for each pixel in the noisy image steps of:
   constructing, for each pixel, a key from a patch, wherein the patch includes locally neighboring pixels around the pixel;
   selecting a function from a function library using the key, wherein the function is a linear function of intensities of the pixels in the patch, and wherein the key maps the pixel to the function selected from the function library; and
   applying the function to the patch to generate a corresponding noise free pixel, wherein the steps are performed in a processor.

2. The method of claim 1, further comprising:
   determining a noise variance for the pixel.

3. The method of claim 2, wherein the noise variance is identical for all pixels with a same value v, and the noise variance is estimated using a $k^{th}$ order statistic of a distribution of noise variances for central pixels of patches with an average value of v.

4. The method of claim 2, further comprising:
   smoothing the noise variances.

5. The method of claim 3, further comprising:
   concatenating a spatial key and a noise key to form the key.

6. The method of claim 5, wherein the spatial key is constructed using a local n-ary pattern.

7. The method of claim 5, further comprising:
   setting a bit in the spatial key to 0 if a difference between the pixel and a neighboring pixel in the patch is smaller than a constant multiplier of the noise variance, and otherwise setting the bit to 1.

8. The method of claim 5, wherein the noise key is an n bit uniform quantization of the noise variance $n(x) = |n|$ bit quantization of $\sigma(x)$.

9. The method of claim 1, further comprising:
   learning the function library from training image samples including pairs of noise free and corresponding noisy training image samples.

10. The method of claim 9, wherein the learning comprises:
    minimizing a difference between each pair of noise free and corresponding denoised training image samples.

11. The method of claim 1, wherein the shape of the patch during the constructing of the key is different than during the applying of the function.

* * * * *